US008907839B2

(12) United States Patent
Oh et al.

(10) Patent No.: US 8,907,839 B2
(45) Date of Patent: Dec. 9, 2014

(54) METHOD AND SYSTEM FOR RECOGNIZING SPACE OF SHOULDER OF ROAD (71) Applicant: Hyundai Motor Company, Seoul (KR)

(72) Inventors: Young Chul Oh, Gyeonggi-do (KR); Surim Kwon, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 206 days.

(21) Appl. No.: 13/710,196

(22) Filed: Dec. 10, 2012

(65) Prior Publication Data

US 2014/0111369 A1 Apr. 24, 2014

(30) Foreign Application Priority Data

Oct. 19, 2012 (KR) ........................ 10-2012-0116819

(51) Int. Cl.
| G01S 13/93 | (2006.01) |
| G01S 13/86 | (2006.01) |
| G01S 15/93 | (2006.01) |
| G06K 9/00 | (2006.01) |
| G08G 1/16 | (2006.01) |
| G01S 13/34 | (2006.01) |
| G01S 13/536 | (2006.01) |

(52) U.S. Cl.
CPC ............. *G01S 13/867* (2013.01); *G01S 13/862* (2013.01); *G01S 15/931* (2013.01); *G01S 13/931* (2013.01); *G06K 9/00798* (2013.01); *G08G 1/167* (2013.01); *G01S 13/345* (2013.01); *G01S 13/536* (2013.01); *G01S 2013/9378* (2013.01); *G01S 2015/937* (2013.01); *B60Q 2300/335* (2013.01)
USPC ................... 342/52; 342/54; 342/55; 342/70; 340/437

(58) Field of Classification Search
CPC ... G01S 13/867; G01S 13/931; G01S 15/931; G01S 13/862; G01S 2015/937; G01S 2013/9378; G01S 13/536; G01S 13/345; G06K 9/00798; G08G 1/167; B60Q 2300/335
USPC ............................. 342/52, 54–55, 70–72, 85; 340/435–437

See application file for complete search history.

(56) References Cited

U.S. PATENT DOCUMENTS 6,697,720 B2    2/2004  Ikeda
7,579,942 B2 *  8/2009  Kalik ............................ 340/435

(Continued)

FOREIGN PATENT DOCUMENTS

| DE | 102012224499 | * | 4/2014 |
| JP | 2005-128722 A | | 5/2005 |
| KR | 10-2012-0067762 | | 6/2012 |

*Primary Examiner* — John B Sotomayor
(74) *Attorney, Agent, or Firm* — Edwards Wildman Palmer LLP; Peter F. Corless (57) ABSTRACT Disclosed herein are a method and a system for recognizing a space of a road shoulder using an ultrasonic wave sensor, a radar and an imaging device. The method includes: controlling the radar to transmit a radar beam within a preset range based on the vehicle location; detecting a fixed object located within the preset range using a reflective wave of the radar beam received by the radar; calculating a distance between the fixed object and the vehicle using the radar when the fixed object is located within the preset range; detecting a solid line lane marking in a front image of a travel lane obtained from the imaging device; and recognizing the calculated distance between the fixed object and the vehicle as a space width of the road shoulder when the solid line lane is in the front image of the travel lane.

18 Claims, 5 Drawing Sheets

(56) References Cited

U.S. PATENT DOCUMENTS

| | | | |
|---|---|---|---|
| 7,933,433 B2* | 4/2011 | Ogawa | 382/104 |
| 2007/0152804 A1* | 7/2007 | Breed et al. | 340/435 |
| 2008/0150786 A1* | 6/2008 | Breed | 342/53 |
| 2014/0111369 A1* | 4/2014 | Oh et al. | 342/52 |
| 2014/0111647 A1* | 4/2014 | Atsmon et al. | 348/148 |
| 2014/0118182 A1* | 5/2014 | Oh et al. | 342/52 |

* cited by examiner

METHOD AND SYSTEM FOR RECOGNIZING SPACE OF SHOULDER OF ROAD

CROSS-REFERENCE TO RELATED APPLICATION

This application claims priority to and the benefit of Korean Patent Application No. 10-2012-0116819 filed in the Korean Intellectual Property Office on Oct. 19, 2012, the entire contents of which are incorporated herein by reference.

BACKGROUND OF THE INVENTION (a) Field of the Invention

The present invention relates to a method and system of recognizing a space of a road shoulder using an ultrasonic wave sensor, a radar, and a video imaging device included in a vehicle.

(b) Description of the Conventional Art

As generally known in the art, a road shoulder is an edge outside a width of the road on for example, an express way or a road reserved for vehicles, and is used for emergency vehicles or broken down vehicles. While a vehicle travels on an expressway or a road reserved for vehicles, when emergency occurs, there is a need to stably drive the vehicle onto the shoulder of the road.

To stably drive the vehicle during an emergency onto the road shoulder, it is necessary to recognize a space (width) of the road shoulder to determine a space capable of accommodating the vehicle. In other words, the driver must confirm whether the space of the road shoulder is a space that the vehicle may travel in or parking.

An exemplary embodiment of a conventional art for recognizing the space of the shoulder of the road uses a laser scanner. However, a laser scanner according to the conventional art used to recognize a space of a road shoulder is expensive. Additionally, the laser scanner according to the conventional art is sensitive to varying weather conditions. It is also known that it is difficult to apply the method to a vehicle because recognition of the space of a road shoulder is not stable.

The above information disclosed in this section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and system of recognizing a space of a road shoulder having advantages of identifying a fixed object (e.g., guard rail) and a movable object using a Doppler effect of a radar, recognizing a distance to the fixed object using the radar and an ultrasonic wave sensor, determining the fixed object as a guard rail when the distance to the fixed object is maintained for a predetermined time or greater, and recognizing the space of the shoulder of the road by recognizing a solid line lane marking using an imaging device.

According to an embodiment of the present invention, a method of recognizing a space of a road shoulder using a distance measuring module, a radar, and an imaging device disposed on a vehicle, may include: controlling the radar to transmit a radar beam within a preset range based on the vehicle location; detecting a fixed object located within the preset range using a reflective wave of the radar beam received by the radar; calculating a distance between the fixed object and the vehicle using the radar and the distance measuring module when the fixed object is located within the preset range; detecting a solid line lane in a front image of a travel lane obtained from the imaging device; and recognizing the calculated distance between the fixed object and the vehicle as a space width of the shoulder of the road when the solid line lane is in the front image of the travel lane.

The distance measuring module may be an ultrasonic sensor which transmits an ultrasonic wave signal and receives a reflective wave reflected from an external object to measure a distance to the external object. Additionally, the calculating of the distance between the fixed object and the vehicle may include: controlling the radar and the ultrasonic wave sensor so the radar beam and the ultrasonic wave signal are reflected and received from the fixed object when the fixed object is located within the preset range; and calculating the distance between the fixed object and the vehicle based on the radar beam and the ultrasonic wave signal reflected and received from the fixed object.

The method may further include determining the calculated distance between the fixed object and the vehicle to be constant for a preset time or greater; and determining the fixed object as a guard rail when the calculated distance between the fixed object and the vehicle remains constant for the preset time or greater and determining the fixed object as an obstacle located within the space of the shoulder of the road when the calculated distance between the fixed object and the vehicle does not remain constant for the preset time or greater.

The method may further include determining a width of the recognized space of the shoulder of the road as a space available to the vehicle based on width data of the vehicle; and when the width of the recognized space of the shoulder of the road may accommodate the vehicle, notifying the driver with information indicating that the width of the recognized space of the shoulder of the road is capable of accommodating the vehicle. Additionally, the method may further include notifying the driver with information indicating that the width of the recognized space of the shoulder of the road may not accommodate the vehicle when the width of the recognized space of the shoulder of the road may not accommodate the vehicle due to width restrictions.

A transceiving area of the radar beam may be wider than a transceiving area of the ultrasonic wave signal. The method may further include changing the traffic lane to a right lane when the solid lane is not included in the lane image.

According to an embodiment of the present invention, a system for recognizing a space of a road shoulder may include a series of commands for executing a method of recognizing the space of the shoulder of the road, the system including: a radar disposed on a vehicle to transceive a signal for identifying a fixed object and a movable object around the vehicle and for calculating a distance to the fixed object; a distance measuring module disposed on the vehicle to transceive the signal for calculating a distance with the fixed object; an imaging device disposed on the vehicle to photograph a surface image of the road; and a controller recognizing the space of the shoulder of the road from signals of the radar, the distance measuring module, and the imaging device, wherein the controller includes at least one processor or microprocessor and may be executed by a predetermined program.

The predetermined program may include controlling the radar to transmit radar beam within a preset range based on the vehicle, detecting a fixed object located within the preset range using a reflective wave of the radar beam received by the radar; calculating a distance between the fixed object and the vehicle using the radar and the distance measuring module when the fixed object is located within the preset range;

detecting a solid line lane marking in a front image of a travel lane captured from the imaging device; and recognizing the calculated distance between the fixed object and the vehicle as a space width of the shoulder of the road when the solid line lane marking is in the front image of the travel lane.

The distance measuring module may be an ultrasonic sensor configured to transmit an ultrasonic wave signal and receive a reflective wave reflected from an external object to measure a distance to the external object. Further, the distance measuring module may be an infrared sensor configured to transmit an infrared signal, and receive a reflective wave reflected from an external object to measure a distance to the external object. The controller may include a notifying unit notifying information about recognition of the space of the shoulder of the road. The ultrasonic wave sensor may be installed at a side of the vehicle to transceive an ultrasonic wave signal from the side of the vehicle, the imaging device may be installed at a front direction of the vehicle to photograph a surface image of the front direction of the vehicle, and the radar may be installed at a front direction or a rear direction of the vehicle to identify the fixed object and the movable object using a Doppler effect during travel of the vehicle and to calculate the distance with the fixed object.

As described above, according to an exemplary embodiment of the present invention, the fixed object (e.g., guard rail) and the movable object may be identified using the Doppler effect of the radar, a distance to the fixed object may be recognized using the radar and an ultrasonic wave sensor, the fixed object may be determined as a guard rail when the distance to the fixed object remains constant for a predetermined time or greater, and the space of the shoulder of the road may be recognized by recognizing a solid line lane marking using an imaging device.

According to an exemplary embodiment of the present invention, the space of the shoulder of the road may be recognized without being influenced by variable weather conditions. Moreover, space information of the shoulder of the road may be provided to a system requiring space information of the shoulder of the road such as an emergency stop system.

DETAILED DESCRIPTION OF THE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules/units and the processor is specifically configured to execute said modules to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, the present invention will be described more fully hereinafter with reference to the accompanying drawings, in which exemplary embodiments of the invention are shown. The present invention may be modified in various different ways, not limited to the exemplary embodiments described herein. In the specification, English characters L, R, and C used with reference numeral refer to left, right, and center if there is no separate description.

Figure 1:
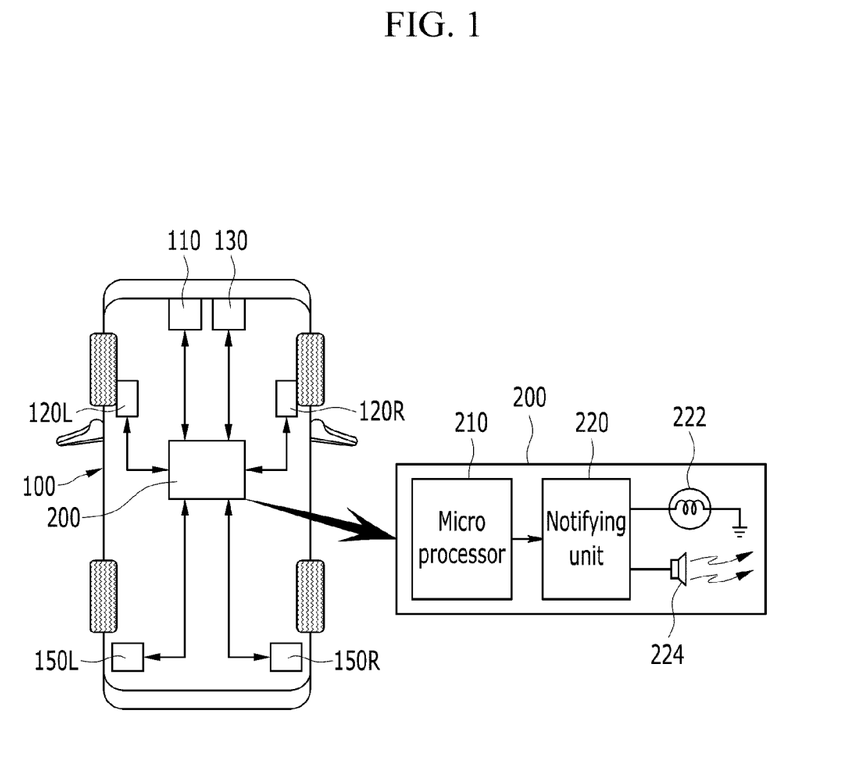
FIG. 1 is an exemplary diagram illustrating a configuration of a system for recognizing a space of a road shoulder according to an exemplary embodiment of the present invention.

FIG. 1 is an exemplary diagram illustrating a configuration of a system for recognizing a space of a road shoulder according to an exemplary embodiment of the present invention. The system for recognizing a space of a road shoulder according to an exemplary embodiment of the present invention may be a system for recognizing a space of a road shoulder for emergency vehicles or broken down vehicles.

The system for recognizing a space of a road shoulder according to an exemplary embodiment of the present invention may include a radar 110 disposed on a vehicle 100 and configured to transceive a signal to identify a fixed object (e.g., guard rail) and a movable object (e.g., peripheral traveling vehicle) around the vehicle; an ultrasonic wave sensor 120R disposed on the vehicle and configured to measure and calculate a distance to the fixed object and transceive an ultrasonic wave signal; an imaging device 130 disposed on the vehicle and configured to capture a surface image of the road; and a controller 200 configured to recognize the space of the shoulder of the road based on signals of the radar 110, the ultrasonic wave sensor 120R, and the imaging device 130, respectively.

In an exemplary embodiment of the present invention, the radar 110 may be a radar (or radar sensor) which is widely used to recognize the fixed object and/or the movable object using the Doppler effect of a reflective wave of an electric wave. Alternatively, the radar 100 may be a radar scanner corresponding to the radar, but it should be understood that the scope of the present invention is not limited thereto. Other configurations capable of substantially identifying the fixed object and the movable object, may be used in the present invention. Since a configuration and an operation of the radar using a Doppler effect according to an exemplary embodiment of the present invention are apparent to a person of an ordinary skill in the art, a detailed description thereof is omitted.

Figure 5:
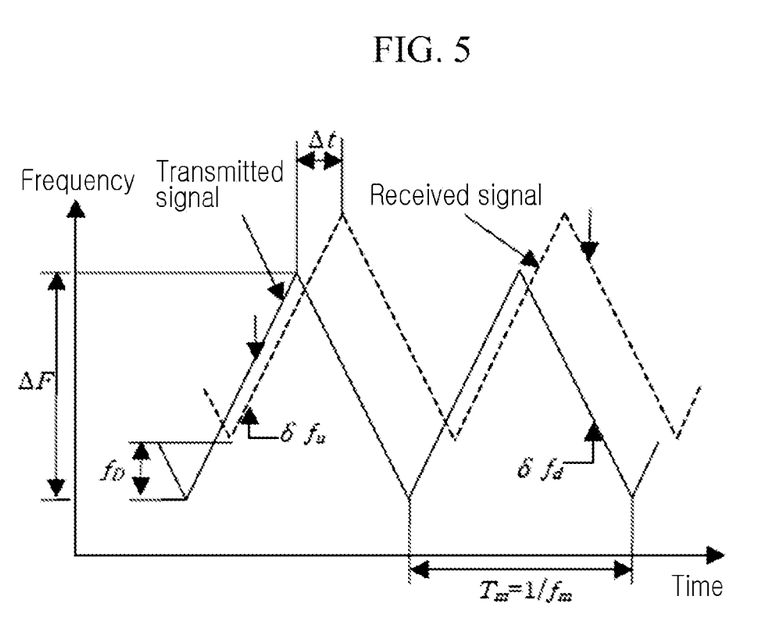
FIG. 5 is an exemplary graph illustrating recognizing a fixed object using a radar and calculating a distance to the fixed object according to an exemplary embodiment of the present invention.

Moreover, in the system for recognizing a space of a road shoulder according to an exemplary embodiment of the present invention, the radar 110 may be installed on a front direction of the vehicle and may be used to identify the fixed object and the movable object around the vehicle and to calculate a distance to the fixed object. As shown in FIG. 1, the radar 110 may be installed on a left side and a right side of a rear direction of the vehicle and may identify the fixed object and the movable object around the vehicle and the distance to the fixed object in a wider area. Accordingly, it is understood that when radars 150L and 150R are installed on a front direction or a rear direction of the vehicle is included in the scope of the present invention In the exemplary embodiment of the present invention, identifying a measured body (e.g., a fixed object and a movable object) using the radar, calculating a distance to the measured body, and speed of the measured body are illustrated in FIG. 5 and determined using the following equations.

$$f_D = (\delta f_d + \delta f_u)/2$$

$$R = \frac{f_D \cdot c}{4 f_m \Delta F}$$

$$v = \frac{(f_D - \delta f_u)c}{2 f_0}$$

Wherein $f_D$ is a Doppler frequency shift of radar beam; R is a distance to the measured body; v is speed of the measured body; $\Delta F$ is maximum shift of Doppler frequency; $f_0$ is a center frequency; and $f_m$ is a modulation frequency.

According to FIG. 5 and the above equations, it is understood that separation of the fixed object and the movable object is possible using a Doppler shift effect of the radar beam.

In an exemplary embodiment of the present invention, as a distance measuring module for calculating a distance to the fixed object, ultrasonic wave sensors 120L and 120R may be used, but it should be understood the scope of the present invention is not limited thereto. For example, an infrared sensor may transceive a signal for substantially calculating the distance with the fixed object, may apply to the present invention.

The ultrasonic wave sensor may be installed on a side of the vehicle 100 for the side of the vehicle 100 to transceive an ultrasonic wave signal.

Moreover, since a road shoulder available to the vehicle 100 is generally located at a right side of the vehicle 100, the ultrasonic wave sensor may be installed at only a right direction of the vehicle 100. However, of the ultrasonic wave sensor 120L may be installed on the left direction of the vehicle when driving a right handle (RH) vehicle, since a shoulder of the road is located at a left side of the vehicle. Accordingly, it should be understood that various forms of the ultrasonic wave sensor installed on a left direction and/or a right direction of the vehicle are included in the scope of the present invention. A configuration and an operation of the ultrasonic wave sensor are apparent to a person of an ordinary skill in the art, and thus a detailed description is omitted.

In an exemplary embodiment of the present invention, the imaging device 130 may be a video imaging device including a charge coupled device (CCD) which is widely used by way of an example, it should be understood that the scope of the present invention is not limited thereto. Another configuration is applicable to the present invention when the foregoing configuration may substantially photograph a surface of the road and a lane. A configuration and an operation of the imaging device are apparent to a person of an ordinary skill in the art, and thus a detailed description is omitted.

The controller 200 may include at least one processor or microprocessor 210 operating by a predetermined program, a notifying unit 220 notifying result information processed by the microprocessor 210, a lamp 222 and a speaker 224 allowing a user to visually and audibly recognize the result according to the signal from the notifying unit 220, and the predetermined program may be configured by a series of commands for executing a method of recognizing a space of a road shoulder according to an exemplary embodiment of the present invention to be described below. The signal from the notifying unit 220 may be transmitted to the system requiring space information of the shoulder of the road such as the emergency stop system so the system may use the space information.

In an exemplary embodiment of the present invention, the controller 200 may be included in a multi-media control system controlling multi-media of the vehicle and a body control module (BCM) controlling body electric parts of the vehicle.

In the method of recognizing the space of the shoulder of the road according to an exemplary embodiment of the present invention to be described below, partial processes may be executed by the multi-media control system and remaining processes may be executed by the BCM associated with the radar and the ultrasonic wave sensor. However, the scope of the present invention is not limited to a following exemplary embodiment. The controller may be implemented by being incorporated with the description of an exemplary embodiment of the present invention.

Hereinafter, the method of recognizing the space of the shoulder of the road according to an exemplary embodiment of the present invention will be described in detail with reference to the accompanying drawings.

Figure 3:
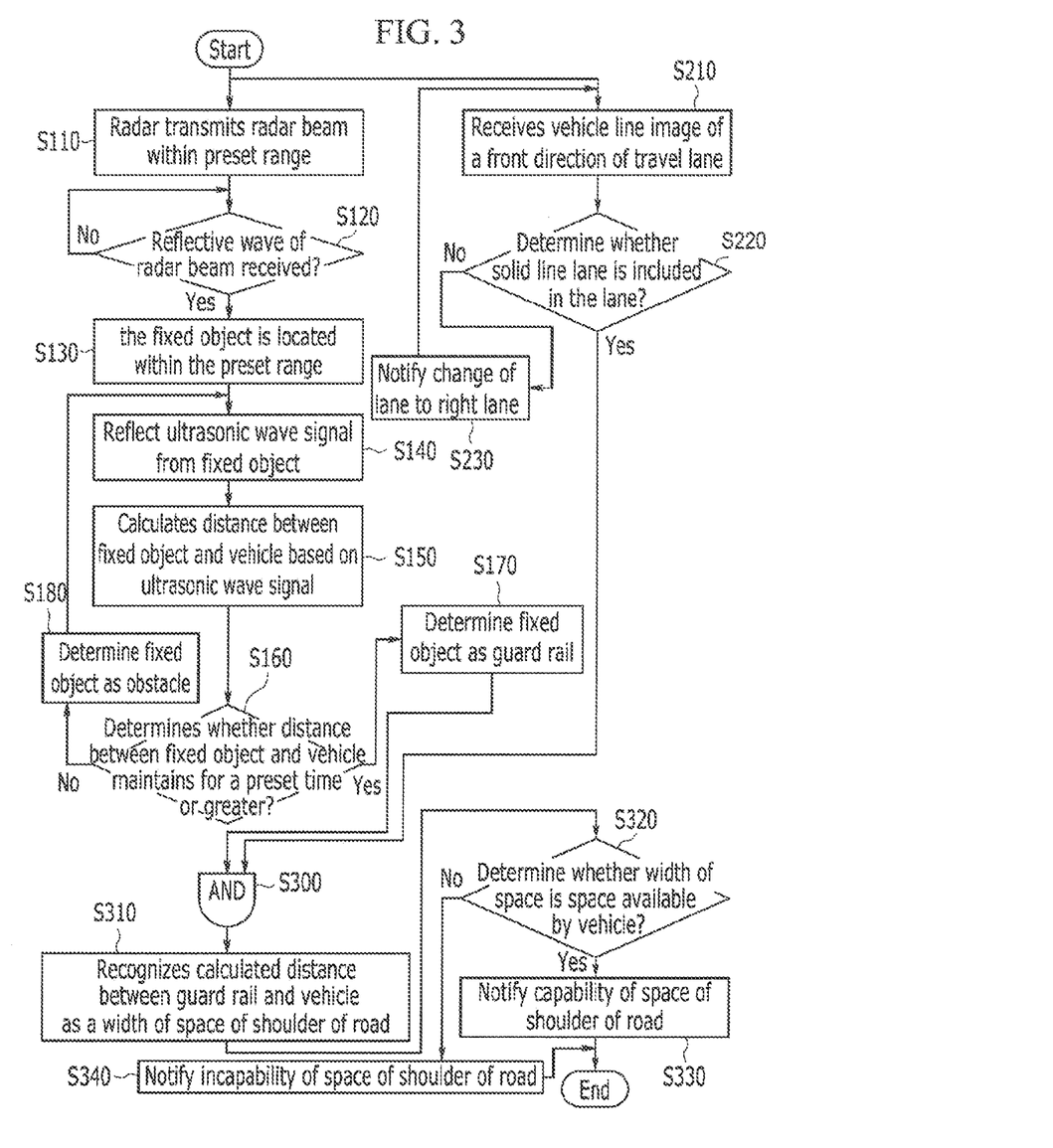
FIG. 3 is an exemplary flowchart illustrating a method of recognizing a space of a road shoulder according to an exemplary embodiment of the present invention.

FIG. 3 is an exemplary flowchart illustrating a method of recognizing a space of a road shoulder according to an exemplary embodiment of the present invention.

Figure 2:
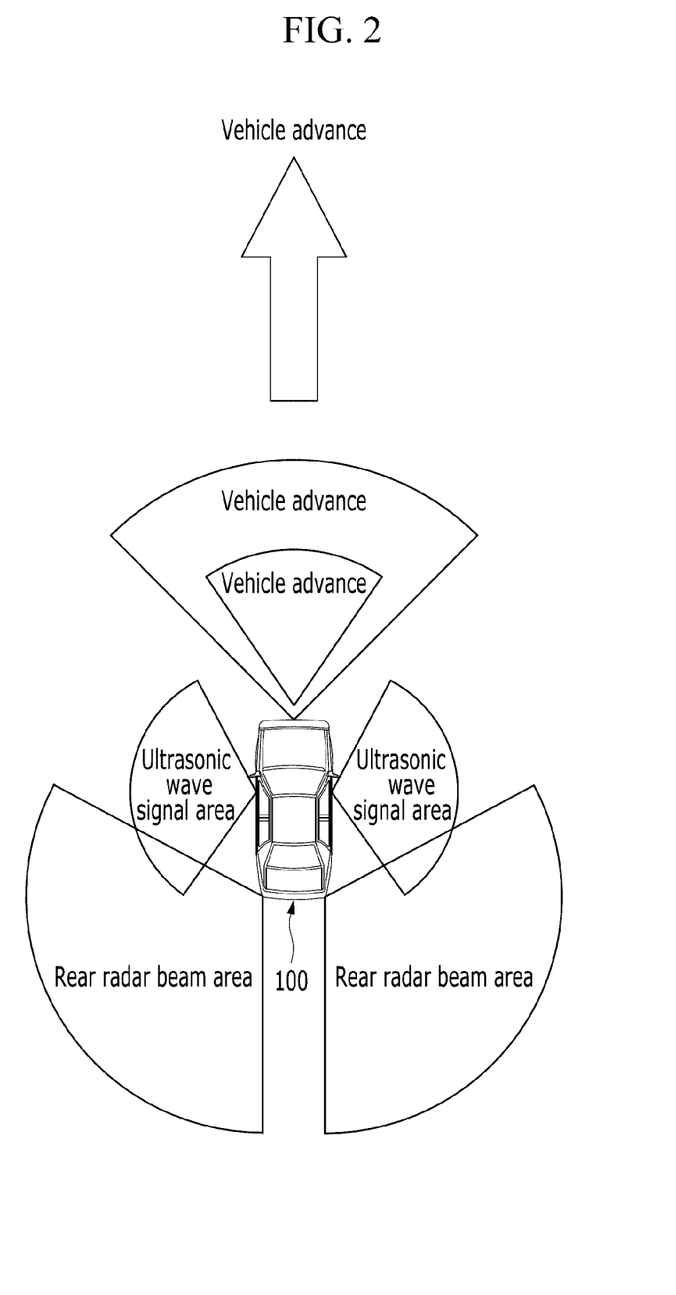
FIG. 2 is an exemplary diagram illustrating signal transceiving areas of a radar, an ultrasonic sensor, and an imaging device applied to an exemplary embodiment of the present invention.

As shown in FIG. 3, the microprocessor 210 of the controller 200 may control the radar 110 to transmit radar beam within a preset range based on the vehicle location as shown in FIG. 2 (S110). The microprocessor 210 may control radars 150L and 150R installed on a left side and a right side of a rear side of the vehicle to increase precision. The microprocessor 210 may further control the radar 110 and the ultrasonic wave sensor 120R, so the preset range to which the radar beam is transmitted is wider and larger than a range to which the ultrasonic wave signal is transmitted, as shown in FIG. 2.

Furthermore, the microprocessor 210 may determine when a reflective wave reflected from a fixed object (e.g., guard rail or obstacle, FIG. 4) located within the preset range is received by the radar 110 (S120). The microprocessor 210 may identify the fixed object and the movable object using a Doppler effect of a reflective wave of the radar beam, and may calculate a distance to the fixed object by a combination with an operation of the ultrasonic wave sensor to be described below. The microprocessor 210 may control the ultrasonic wave sensor 120R to receive an ultrasonic wave signal reflected from the fixed object (S140) in response to determining the fixed object located within the preset range (S130).

In addition, the microprocessor 210 may calculate a distance between the fixed object and the vehicle 100 based on the ultrasonic wave signal reflected from the fixed object (S150). The microprocessor 210 may compare the distance information with respect to the fixed object obtained by the Doppler effect of the reflective wave of the radar with the ultrasonic wave signal to increase reliability of the distance to the fixed object.

As described above, when the distance between the fixed object and the vehicle 100 is calculated based on the ultrasonic wave signal and the Doppler effect of the reflective wave of the radar beam, the microprocessor 210 may determine when the distance between the fixed object and the vehicle 100 remains constant for a preset time (e.g., 3 seconds) or greater (S160).

Figure 4:
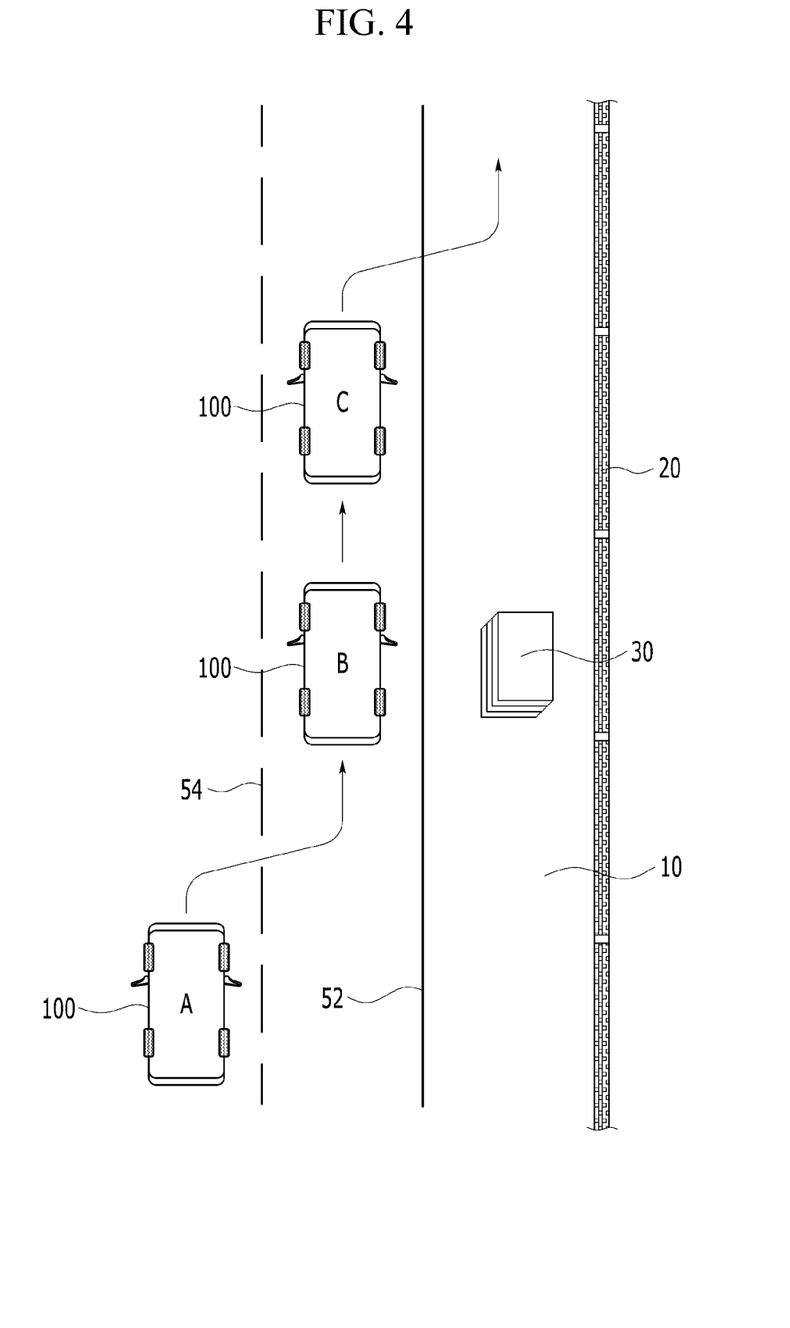
FIG. 4 is an exemplary diagram illustrating an exemplary embodiment of the present invention.

When the distance between the fixed object and the vehicle 100 remains constant for the preset time or greater, the microprocessor 210 may determine the fixed object as a guard rail 20 of FIG. 4 (S170). When the distance between the fixed object and the vehicle 100 does not remain constant for the preset time (e.g., 3 seconds) or greater, the microprocessor 21 may determine the fixed object as an obstacle 30 in the space of the shoulder 10 of the road (S180). When the distance between the fixed object and the vehicle 100 remains constant for the preset time or greater, the vehicle 100 may be located at a point C in FIG. 4. When the distance between the fixed object and the vehicle 100 does not remain constant for the preset time or greater, the vehicle 100 may be located at a point B of FIG. 4.

Moreover, the microprocessor 210 may control the imaging device 130 and receive a lane image of a front direction of a travel lane from the imaging device 120 to detect a solid line lane marking 52 of FIG. 4 in the lane image (S210 and S220). Determining the solid line lane marking 52 or a dotted line lane marking 54 in the lane image of the imaging device 130 is apparent to a person of an ordinary skill in the art, and thus a detailed description thereof is omitted.

When the solid line lane marking 52 is not in the lane image, the vehicle 110 may be located at a point A of FIG. 4, and the microprocessor 210 may control and notify the notifying unit 220 to change a lane to a right lane through the lamp 222 or the speaker 224 (S230). Furthermore, when the solid line lane marking 52 is in the lane image and it is determined that the fixed object is the guard rail 20 (S300), the microprocessor 210 may recognize the calculated distance between the guard rail 20 and the vehicle 100 as a space width of the shoulder of the road (S310).

After recognizing the calculated distance between the guard rail 20 and the vehicle 100 as a width of a space of the shoulder of the road, the microprocessor 210 may determine the space width as a space available by the vehicle 100 based on width data of the vehicle 100 (S320). The microprocessor 210 may determine the space width of the shoulder of the road is the width available by the vehicle 100 based on width data of the vehicle 100, but it should be understood that the scope of the present invention is not limited thereto. Storing and using the width data of the vehicle in the memory (not shown) will be apparent to a person of an ordinary skill in the art.

When the space width is the length (width) capable of accommodating the vehicle, the microprocessor 210 may control the notifying unit 220 to notify the driver through the lamp 222 or the speaker 224 or to notify other systems (e.g., emergency stop system during emergency situation) (S330). Alternatively, when the space width is not the length (width) capable of accommodating the vehicle, the microprocessor 210 may control the notifying unit 220 to notify the driver through the lamp 222 or the speaker 224 or to notify the other systems (e.g., emergency stop system during emergency situation) (S340).

Accordingly, the method of recognizing a space of a road shoulder and a system thereof according to an exemplary embodiment of the present invention may recognize the space of the road shoulder using the ultrasonic wave sensor, the radar, and the video imaging device.

While this invention has been described in connection with what is presently considered to be exemplary embodiments, it is to be understood that the invention is not limited to the disclosed embodiments, but, on the contrary, is intended to cover various modifications and equivalent arrangements included within the spirit and scope of the accompanying claims.

What is claimed is:

1. A method of recognizing a space of a road shoulder using a distance measuring module, a radar, and an imaging device disposed on a vehicle, the method comprising:
   controlling, by a controller, the radar to transmit a radar beam within a preset range based on the vehicle location;
   detecting, by the controller, a fixed object located within the preset range using a reflective wave of the radar beam received by the radar;
   calculating, by the controller, a distance between the fixed object and the vehicle using the radar when the fixed object is located within the preset range;
   detecting, by the controller, a solid line lane marking in a front image of a travel lane obtained from the imaging device; and
   recognizing, by the controller, the calculated distance between the fixed object and the vehicle as a space width of the road shoulder when the solid line lane marking is in the front image of the travel lane.

2. The method of claim 1, further comprising calculating the distance to the fixed object using an ultrasonic sensor configured to transmit an ultrasonic wave signal and receive a reflective wave reflected from an external object.

3. The method of claim 2, further comprising:
   controlling, by the controller the radar and the ultrasonic wave sensor to reflect and receive the radar beam and the ultrasonic wave signal from the fixed object when the fixed object is located within the preset range; and
   calculating, by the controller, the distance between the fixed object and the vehicle based on the radar beam and the ultrasonic wave signal reflected and received from the fixed object.

4. The method of claim 1, further comprising:
   determining, by the controller, when the calculated distance between the fixed object and the vehicle remains constant for a preset time or greater;
   determining, by the controller, the fixed object as a guard rail when the calculated distance between the fixed object and the vehicle remains constant for the preset time or greater; and determining, by the controller, the fixed object as an obstacle located within the space of the road shoulder when the calculated distance between the fixed object and the vehicle does not remain constant for the preset time or greater.

5. The method of claim 1, further comprising
determining, by the controller, when a width of the recognized space of the road shoulder is a space available to the vehicle based on width data of the vehicle; and
notifying, by the controller, a driver with information indicating that the width of the recognized space of the road shoulder is the space available to the vehicle, in response to the width of the recognized space of the road shoulder as the space available to the vehicle.

6. The method of claim 5, further comprising:
notifying, by the controller, the driver with information indicating that the recognized space of the road shoulder is not the space available to the vehicle when the width of the recognized space of the road shoulder is not the space available by the vehicle.

7. The method of claim 2, wherein a transceiving area of the radar beam is wider than a transceiving area of the ultrasonic wave signal.

8. The method of claim 1, further comprising:
notifying, by the controller, the driver to trigger a lane change to a right lane when the solid lane marking is not in the lane image.

9. A system for recognizing a space of a road shoulder, the system comprising:
a radar disposed on a vehicle configured to transceive a signal;
an ultrasonic sensor disposed on the vehicle configured to transceive the signal;
an imaging device disposed on the vehicle configured to photograph a surface image of the road; and
a controller configured to:
control the radar to transmit a radar beam within a preset range based on the vehicle location;
detect a fixed object located within the preset range using a reflective wave of the radar beam received by the radar;
calculate a distance between the fixed object and the vehicle using the radar and the ultrasonic sensor when the fixed object is located within the preset range;
detect a solid line lane marking in a front image of a travel lane obtained from the imaging device; and
recognize the calculated distance between the fixed object and the vehicle as a space width of the road shoulder when the solid line lane marking is in the front image of the travel lane.

10. The system of claim 9, wherein the ultrasonic sensor is configured to transmit an ultrasonic wave signal and receive a reflective wave reflected from an external object to measure a distance to the external object.

11. The system of claim 9, wherein the controller is further configured to notify a driver with information of the recognition of the space of the shoulder of the road.

12. The system of claim 10, wherein:
the ultrasonic wave sensor is installed on a side of the vehicle to transceive the ultrasonic wave signal from the side of the vehicle;
the imaging device is installed on a front direction of the vehicle to photograph a surface image of the front direction of the vehicle; and
the radar is installed on a front direction or a rear direction of the vehicle to identify the fixed object and the movable object using a Doppler effect during travel of the vehicle, and to calculate the distance with the fixed object.

13. The system of claim 9, further comprising an infrared sensor configured to transmit an infrared signal, and receive a reflective wave reflected from an external object to measure a distance to the external object.

14. A non-transitory computer readable medium containing program instructions executed by a processor or controller, the computer readable medium comprising:
program instructions that control a radar to transceive a signal;
program instructions that control an ultrasonic sensor to transceive the signal;
program instructions that control an imaging device to photograph a surface image of the road;
program instructions that control the radar to transmit a radar beam within a preset range based on the vehicle location;
program instructions that detect a fixed object located within the preset range using a reflective wave of the radar beam received by the radar;
program instructions that calculate a distance between the fixed object and the vehicle using the radar and the ultrasonic sensor when the fixed object is located within the preset range;
program instructions that detect a solid line lane marking in a front image of a travel lane obtained from the imaging device; and
program instructions that recognize the calculated distance between the fixed object and the vehicle as a space width of the road shoulder when the solid line lane marking is in the front image of the travel lane.

15. The computer readable medium of claim 14, further comprising program instructions to transmit an ultrasonic wave signal and receive a reflective wave reflected from an external object to measure a distance to the external object.

16. The computer readable medium of claim 14, further comprising:
program instructions that notify a driver with information of the recognition of the space of the shoulder of the road.

17. The computer readable medium of claim 15, further comprising:
program instructions that control the ultrasonic sensor to transceive the ultrasonic wave signal from a side of the vehicle;
program instructions that control the imaging device to photograph a surface image of a front direction of the vehicle the;
program instructions that control the radar to identify the fixed object and the movable object using a Doppler effect during travel of the vehicle, and to calculate the distance with the fixed object.

18. The computer readable medium of claim 14, further comprising:
program instructions that control an infrared sensor to transmit an infrared signal, and receive a reflective wave reflected from an external object to measure a distance to the external object.

* * * * *